(12) United States Patent
Oliver Vargas

(10) Patent No.: US 9,452,484 B2
(45) Date of Patent: Sep. 27, 2016

(54) METHOD FOR COMPONENT MACHINING BY ABLATION AND CONTROLLED RECAST LAYER REMOVAL BY FLUORIDE ION CLEANING

(71) Applicant: Ivan F. Oliver Vargas, Houston, TX (US)

(72) Inventor: Ivan F. Oliver Vargas, Houston, TX (US)

(73) Assignee: Siemens Energy, Inc., Orlando, FL (US)

(*) Notice: Subject to any disclaimer, the term of this patent is extended or adjusted under 35 U.S.C. 154(b) by 503 days.

(21) Appl. No.: 13/953,883

(22) Filed: Jul. 30, 2013

(65) Prior Publication Data

US 2015/0034603 A1    Feb. 5, 2015

(51) Int. Cl.
| | |
|---|---|
| *B23H 9/10* | (2006.01) |
| *B23K 26/36* | (2014.01) |
| *B23P 15/02* | (2006.01) |
| *B23K 26/16* | (2006.01) |
| *B08B 7/00* | (2006.01) |
| *B23K 26/40* | (2014.01) |
| *B23H 1/00* | (2006.01) |

(52) U.S. Cl.
CPC ............... *B23H 9/10* (2013.01); *B08B 7/0014* (2013.01); *B08B 7/0042* (2013.01); *B23K 26/16* (2013.01); *B23K 26/36* (2013.01); *B23K 26/40* (2013.01); *B23P 15/02* (2013.01); *B23H 1/00* (2013.01); *B23K 2201/001* (2013.01); *B23K 2203/08* (2013.01); *B23P 2700/06* (2013.01)

(58) Field of Classification Search
CPC ............ B23H 5/00; B23H 5/02; B23H 7/00; B23H 9/00; B23H 9/10
See application file for complete search history.

(56) References Cited

U.S. PATENT DOCUMENTS

| 5,269,057 | A | * | 12/1993 | Mendham | ................. | B23H 9/10 |
|---|---|---|---|---|---|---|
| | | | | | | 29/402.08 |
| 2009/0308761 | A1 | * | 12/2009 | Gehron | .................... | B23H 9/10 |
| | | | | | | 205/717 |

* cited by examiner

*Primary Examiner* — Brian Jennison

(57) ABSTRACT

Components, such as turbine blades or vanes, are formed to a desired shape and dimensions by ablation machining a work piece surface. Recast layer material created on the work piece surface during the ablation machining is subsequently removed by fluoride ion cleaning (FIC). Exemplary ablation machining methods include laser machining and electric discharge machining (EDM). The work piece material may include superalloys commonly used for fabrication of turbine blades or vanes, which are susceptible to recast layer formation during EDM or laser machining. Post ablation FIC recast layer removal is easier than known methods, such as mechanical grinding, secondary EDM machining of the layer at lower speeds and/or current intensity, or chemical etching processes. Ablation machining processes can be optimized for speed and efficiency without regard for recast layer avoidance, with knowledge that the recast layer will be subsequently removed by the complimentary FIC process.

11 Claims, 4 Drawing Sheets

METHOD FOR COMPONENT MACHINING BY ABLATION AND CONTROLLED RECAST LAYER REMOVAL BY FLUORIDE ION CLEANING

BACKGROUND OF THE INVENTION

1. Field of the Invention

The invention relates to component machining by electric discharge machining (EDM) or laser ablation machining of a work piece and subsequent removal of the ablation machining recast layer from the work piece by fluoride ion cleaning, so that the cleaned machined component has a desired shape and dimensions in accordance with component specifications. Exemplary embodiments of the invention relate to methods for machining turbine superalloy components, such as blades or vanes by EDM or laser ablation machining and subsequent removal of the ablation machining recast layer from the work piece by fluoride ion cleaning, so that the cleaned machined turbine component has a desired shape and dimensions in accordance with component specifications. The methods herein facilitate higher speed EDM or laser machining without fear of recast layer formation, and subsequent chemical removal of the recast layer, leaving an oxide-free component surface ready for further repair operations, such as brazing or welding. Embodiments of the present invention are suitable for machining cooling holes in superalloy turbine blades or vanes or formation of turbine seal slots.

2. Description of the Prior Art

Components, such as turbine blades and vanes, have complex, multi-dimensional geometric shapes are constructed of superalloy materials. Turbine component shape and superalloy machining complexities favor use of so-called "unconventional" ablation machining processes, such as laser machining or electrical discharge machining (EDM), compared to "traditional" cutting and grinding machining processes. Ablation machining can create a recast layer on the component machined surface comprising re-deposited carbonized molten metal particles, including oxides. Typically the recast layer is removed by conventional machining or chemical etching to conform the component's dimensions to the desired specifications. This removal adds additional steps, costs and time delays in the manufacturing process. For example, chemical etching processes leave undesirable oxide films on the workpiece surface and conventional machining leaves surface contaminants. The turbine component surfaces often require yet additional cleaning steps, such as fluoride ion cleaning (FIC) to prepare them for further manufacture or repair procedures, such as deposition of filler layers by welding or brazing processes.

In the past, ablation machining of components, such as nickel-based superalloy component used in turbine vanes and blades, has often focused on recast layer minimization or avoidance by lowering the component ablation rate, thereby slowing component production rate. Other past ablation machining recast layer avoidance solutions have been to ablate the component in a feedback loop, adjusting the ablation rate to minimize recast layer formation or sequential ablation rates that achieve cutting objectives, with subsequent recast layer removal as lower ablation rates. In the case of EDM processes electrode size and current application rates have been lowered to reduce recast layer formation, with or without the aid of feedback loops. In other EDM processes, sequential passes have been performed to cut most of the component surface at a relatively high speed, then lowering the current application and/or electrode size in final finishing passes, so that the final desired dimensional requirements are met without leaving any or at most a trace recast layer on the component surface that could be removed by minor conventional machining remediation operations.

Thus, a need exists in the art for a component ablation machining process (e.g., EDM) that incorporates an easily performed recast layer removal process, so that recast layer formation becomes less of a machining process concern. In this manner the ablation machining speed would be prioritized and optimized. Recast layer formation concerns would be addressed by knowledge that recast layer removal would be adequately addressed in the subsequent processing steps.

SUMMARY OF THE INVENTION

Accordingly, an object of the invention is to create a component ablation machining process (e.g., EDM) that incorporates an easily performed recast layer removal process, so that recast layer formation becomes less of a machining process concern.

This and other objects are achieved in accordance with embodiments of the present invention by forming components, such as turbine blades or vanes, to a desired shape and dimensions by ablation machining a work piece surface. Recast layer material created on the work piece surface during the ablation machining is subsequently removed by fluoride ion cleaning (FIC). Exemplary ablation machining methods include laser machining and electric discharge machining (EDM). The work piece material may include superalloys commonly used for fabrication of turbine blades or vanes, which are susceptible to recast layer formation during EDM or laser machining. Post ablation FIC recast layer removal is easier than known methods, such as mechanical grinding, secondary EDM machining of the layer at lower speeds and/or current intensity, or chemical etching processes. In some embodiments of the invention, the component may repaired by brazing or welding prior to or after the ablation machining and fluoride ion cleaning processes. Performance of the invention method machining methods prior to subsequent brazing or welding of filler material on the component advantageously provides a clean, oxide-free surface to promote bonding between the component surface and the filler material layer.

Fluoride ion cleaning (FIC) removal of a recast layer formed during ablation machining processes, such as laser machining or electric discharge machining (EDM) is performed quicker and with less effort than traditional recast layer removal secondary low speed/current EDM or mechanical abrasion or grinding machining methods. Unlike known chemical etching recast layer removal processes, FIC leaves an oxide-free treated surface on the component, facilitating post machining processes such as filler material application by brazing or welding processes. Integration of FIC, as a subsequent complimentary recast layer removal step with ablation machining processes that create significant amounts of recast layer, achieves component final desired shape and dimensional specifications with the existing ablation machining processes. Easier than known recast layer removal by FIC enables existing ablation machining processes, (e.g., EDM) to be performed at quicker speed without concern about recast layer formation. The FIC follow up process removes the recast layer and additionally cleans the component for subsequent post-machining processing steps, so that EDM or other ablation machining processes that tend to form recast layers can be optimized for speed and efficiency with less concern for consequences of recast layer formation.

Embodiments of the invention feature a method for machining a component, comprising forming a work piece surface to a desired component shape and dimensions by ablation machining, which creates a recast oxide layer on the formed surface; and removing the recast layer from the formed surface by fluoride ion cleaning (FIC). In embodiments of the invention the ablation machining is electrical discharge machining (EDM) or laser machining. Component shapes can comprise circular or other shape holes or slots formed into the work piece, including by orbiting the ablation machining device (such as an EDM electrode) in a pattern that is smaller than the desired component shape and dimensions with the formed recast layer adjoining the work piece material surface having the desired component shape and dimensions.

Other embodiments of the invention feature machining a superalloy component, by forming a superalloy work piece (such as a turbine blade or vane) surface to a desired component shape and dimensions by ablation machining, which creates a recast oxide layer on the formed surface. The recast layer is removed from the formed surface by fluoride ion cleaning (FIC), leaving an oxide-free component surface having the desired shape and dimensions.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of described embodiments of the invention can be readily utilized in ablation machining of components, such as turbine blades or vanes formed from nickel-based superalloys. The components are formed to a desired shape and dimensions by ablation machining a work piece surface. Exemplary ablation machining methods include laser machining and electric discharge machining (EDM). Nickel-based superalloys are susceptible to recast layer formation during ablation machining operations. The recast layer material created on the work piece surface during the ablation machining is subsequently removed by fluoride ion cleaning (FIC). Post ablation FIC recast layer removal is easier than known methods, such as mechanical grinding, sequential EDM machining of the layer at lower speeds and/or current intensity, or chemical etching processes. Ablation machining processes can be optimized for speed and efficiency without regard for recast layer avoidance, with knowledge that the recast layer will be subsequently removed by the complimentary FIC process.

Figure 1:
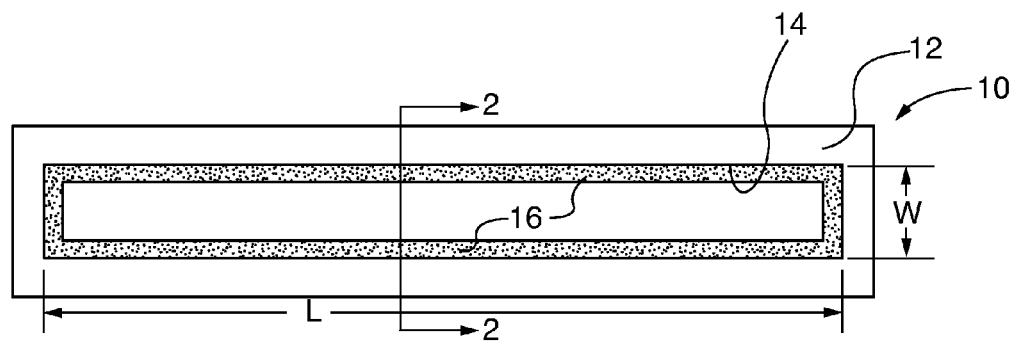
FIG. 1 is a plan view of an exemplary turbine seal slot formed by an EDM or laser ablation machining process having a recast layer adjoining the component surface.
Figure 2:
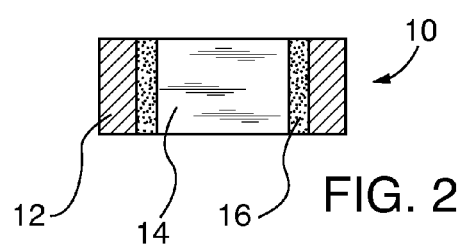
FIG. 2 is a cross sectional view of the turbine seal slot taken along 2-2 of FIG. 1.
Figure 3:
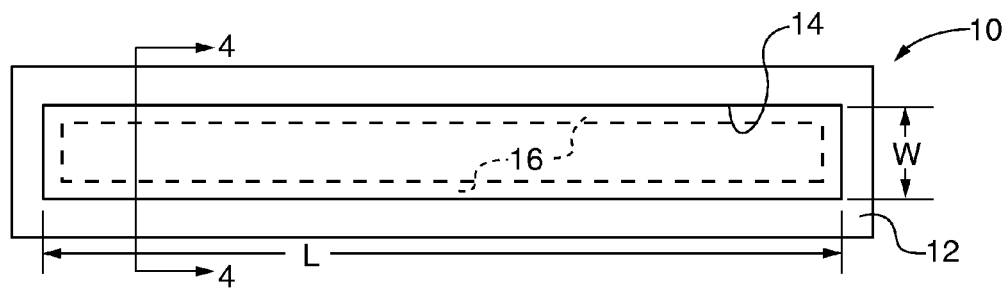
FIG. 3 is a plan view of the turbine seal slot of FIG. 1 after removal of the recast layer by fluoride ion cleaning (FIC)
Figure 4:
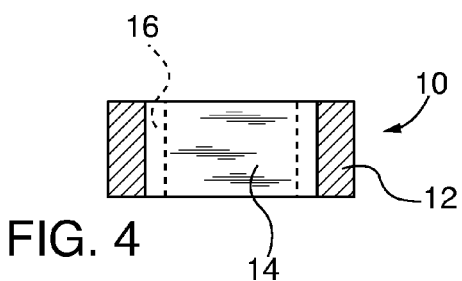
FIG. 4 is a cross sectional view of the turbine seal slot taken along 4-4 of FIG. 3.

Referring generally to FIGS. 1-7, exemplary embodiments of the invention by electrical discharge ablation machining (EDM) followed by FIC of a known turbine vane 10 component seal slot 12 and known turbine blade 20 component cooling holes 22 will be described. In FIGS. 1-2, a turbine vane 10 cooling slot 12 formed in the component work piece has desired specifications of a rectangular shape as well as width W and length L dimensions. During EDM processes on the component work piece, cooling slot dimensions for L and W are established at the edges or margins 14 of the work piece, which abut an adjoining recast layer 16. The recast layer 16 is subsequently removed in a known fluoride ion cleaning (FIC) process, leaving a finished turbine vane 10 with a cooling slot 12 defined by the margins 14 that have the desired specification shape and dimensions L, W, as shown in FIGS. 3 and 4.

Figure 5:
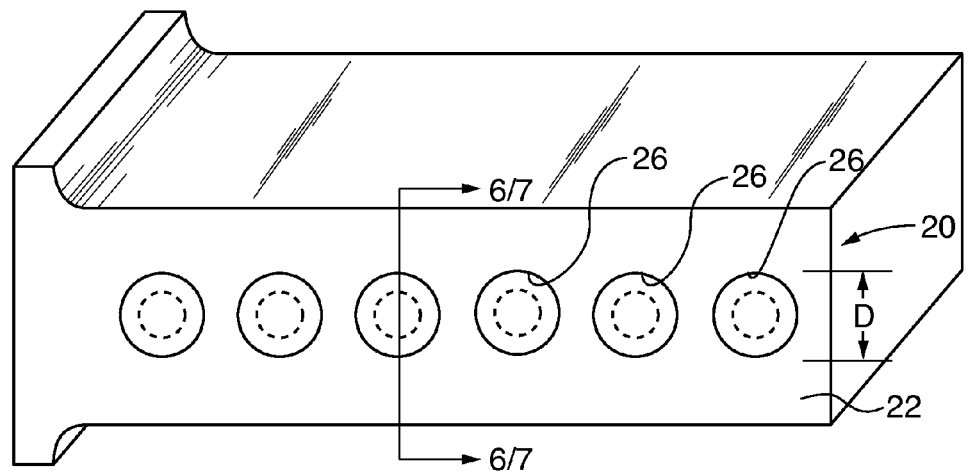
FIG. 5 a perspective schematic view of a series of turbine blade cooling holes after ablation machining and removal of the recast layer by FIC.
Figure 6:
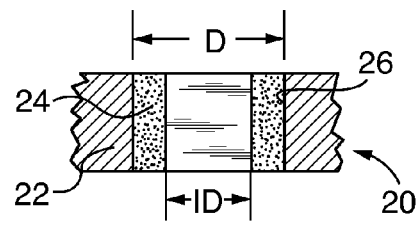
FIG. 6 is a cross sectional view of a turbine blade cooling hole taken along 6-6 of FIG. 5 prior to removal of the recast layer by FIC.
Figure 7:
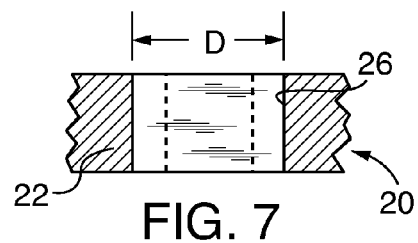
FIG. 7 is a cross sectional view of a turbine blade cooling hole taken along 7-7 of FIG. 5 after removal of the recast layer by FIC.

In FIGS. 5-7 a turbine blade 20 has a plurality of machined cooling holes 22 in communication with the blade interior and exterior. The holes 22 are formed as circular holes having a diameter D defined by the hole edges or margins 26. In this example the hole diameter specification is 0.140 inch (0.140") with an allowance for a recast layer 24 of up to a total thickness of 0.002" (reducing minimum hole diameter tolerance to 0.138").

Hole 22 formation by the known EDM methods of FIG. 6 will be used as an example. In step 50 known pre-EDM machining blade 20 processes are performed, which may include deposit of filler material on the blade 20 by brazing or welding processes (such as for filling excessively worn cooling holes in a repairable blade), removal of scaling, etc. In step 52 the specification for cooling hole diameter D is identified as 0.140". In step 54 EDM is performed to establish the cooling hole diameter margin 26 using a known current speed and a 0.130" electrode size that is orbited 0.005" about the electrode central axis, which forms a finished hole diameter or 0.140". The EDM current speed is chosen to create no recast layer, which will be less than the electric discharge machine's maximum cutting speed. The cooling hole margin 26 final dimension D of 0.140" is confirmed at step 56. Thereafter at step 58 the blade 20 undergoes further post EDM machining steps, which may for example include known fluoride ion cleaning to prepare the blade surfaces for subsequent welding or brazing repairs of cracks, thermal bond coat application, etc. The current application speed alternatively may be increased to allow formation of a recast layer, but the final inner diameter (ID) of the formed hole still meets the minimum diameter specification of 0.138". Assuming that a maximum recast layer of 0.002" will be formed after electrical discharge machining the part under the chosen current speed/heat input parameters, no additional processes are required to meet both of the specification dimensional and recast layer requirements for the blade 20.

Figure 8:
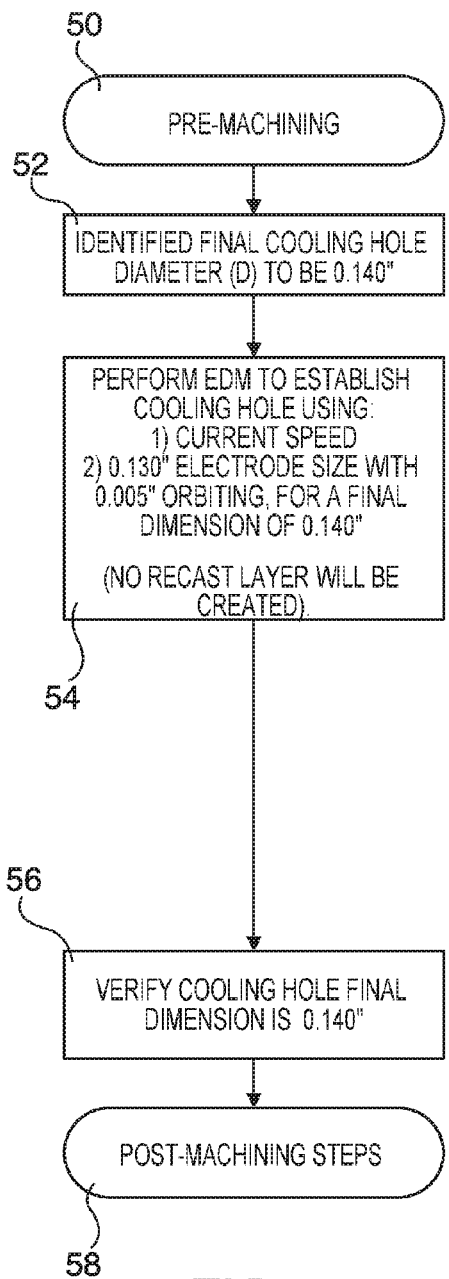
FIG. 8 is a flowchart of a known method for ablation machining of a turbine blade cooling hole.
Figure 9:
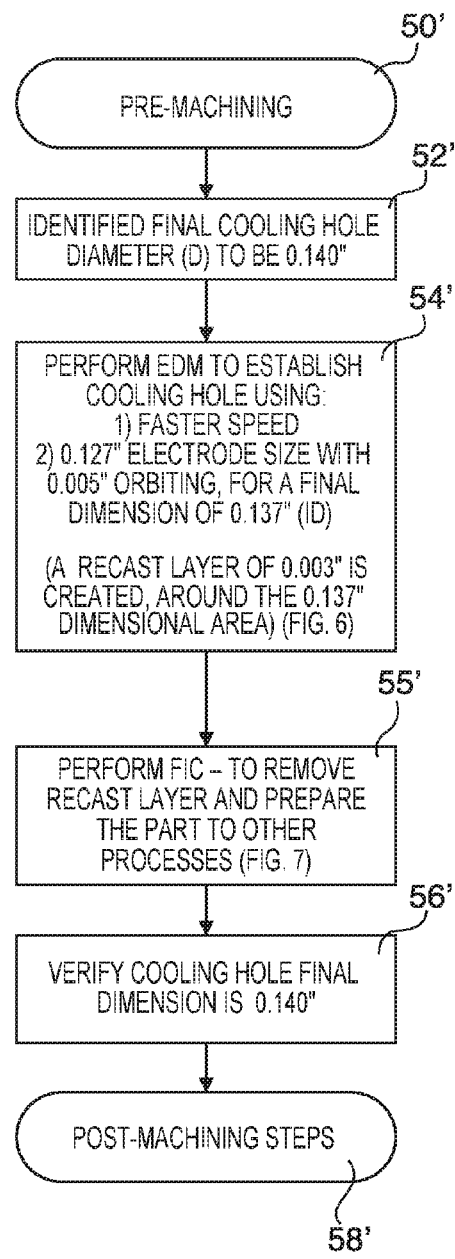
FIG. 9 is a flowchart of a method for ablation machining of a turbine blade cooling hole, followed by removal of the recast layer by FIC, in accordance with an exemplary embodiment of the invention.

Forming a turbine blade cooling hole in accordance with an embodiment of the invention is shown and described in FIG. 9. In step 50' known pre-EDM machining blade 20 processes are performed, which may include deposit of filler material on the blade 20 by brazing or welding processes (such as for filling excessively worn cooling holes in a repairable blade), removal of scaling, etc. In step 52' the specification for cooling hole diameter D is identified as 0.140", as it was in the known procedures described for FIG. 8. In step 54' EDM is performed to establish the cooling hole diameter margin 26 using a higher/faster current speed than the prior known current speed used in the known process of FIG. 8. In this process a smaller 0.127" electrode size that is orbited 0.005" about the electrode central axis. The orbiting electrode forms a finished hole diameter D of 0.140" with a recast layer 24 of ID 0.137". The recast layer ID is smaller than the allowable tolerance dimension of 0.138".

Figure 10:
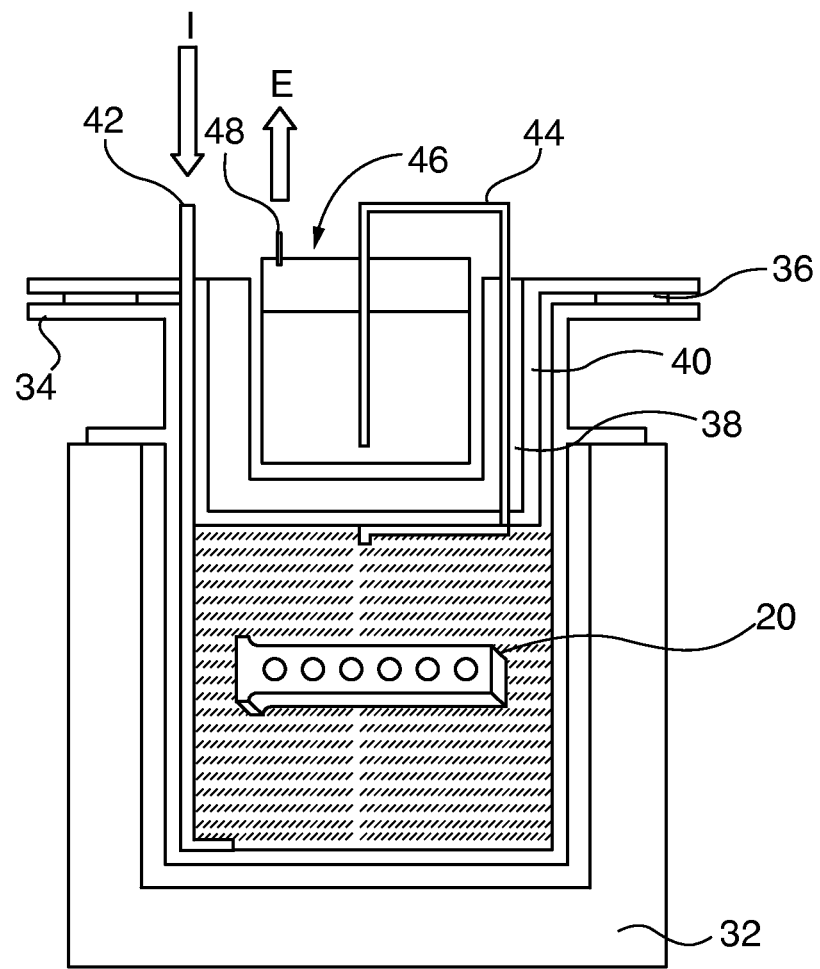
FIG. 10 is a schematic elevational view of a known fluoride ion cleaning furnace apparatus.

In step 55' the recast layer 24 is removed from the blade hole 22 by placing the blade 20 into the known fluorine ion cleaning apparatus 30 of FIG. 10. The FIC apparatus 30 has a temperature controllable heated furnace 32 for heating a retort 34 placed therein. An O ring 36 and insulated cover 38 seal the retort 32 contents from ambient atmosphere. Water cooling jacket 40 in conjunction with the furnace 32 temperature controlling functions facilitate FIC process temperature and temperature change rate. Gas inlet port 42 introduces reactant gas, such as hydrogen fluoride (HF) into the furnace chamber. Post reaction gasses are exhausted by outlet port 44 into a scrubber 46, then through the exhaust port 48. Chemical reaction occurring in the FIC apparatus 30 strips the recast layer 24 and other oxides from the blade 20. leaving a clean surface blade shown in FIG. 7.

In the method of the invention embodiment of FIG. 9 the cooling hole margin 26 final dimension D of 0.140" is confirmed at step 56' (FIG. 7). Thereafter at step 58' the blade 20 undergoes further post EDM machining steps. FIC is often included in the post machining steps. However, the blade 20 has already been fluorine ion cleaned in step 55' so the blade 20 surfaces are ready for subsequent welding or brazing repairs of cracks, thermal bond coat application, etc. Thus FIC, previously used only for post-machining blade 20 cleaning in the known EDM ablation machining method of FIG. 8 now serves the added process function of removing the recast layer 24 from the blade, by modifying as necessary the FIC process temperature, chemical solution strengths and process time, etc., in known fashion.

Embodiments of the invention facilitate quicker EDM or laser ablation machining of components, such as superalloy turbine vanes and blades, without fear of recast layer formation, allowing for optimization of machining speed. Any formed recast layer is subsequently removed by FIC, which in the past may have been included as part of the overall component manufacture and/or repair processes. The FIC process employed as part of the invention embodiments is adjusted as necessary to assure satisfactory recast layer removal.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for machining a component, comprising:
establishing desired component shape and dimensions for a work piece machined surface to be formed by an electrical discharge machining (EDM) or a laser machining ablation method, which creates a recast oxide layer on the machined surface;
establishing ablation machining speed and energy application rates for forming the machined surface to the desired component shape and dimensions;
determining recast oxide layer thickness that will result from performing the ablation machining speed and energy application rates, prior to said machining;
determining a fluoride ion cleaning (FIC) process that is intended to remove all of the previously determined oxide layer thickness, prior to said cleaning;
ablation machining the work piece with an EDM or laser machining apparatus, at the established machining speed and energy application rates, so that a resultant machined surface of the work piece conforms with the established component shape and dimensions, forming a recast oxide layer of the previously determined thickness there upon;
performing the determined FIC process with FIC apparatus;
inspecting the work piece after completion of the FIC process, in order to confirm that the machined surface of the work piece conforms with the established component shape and dimensions and that it has a clean surface, which has no recast layer.

2. The method of claim 1, the component comprising a turbine blade or vane.

3. The method of claim 1, the component shape comprising a circular hole formed by orbiting an EDM electrode in a circular pattern that is smaller than the desired circular hole dimension diameter; the performed FIC process terminated before removing all of the formed recast layer, so that the remaining formed recast layer outer diameter adjoining the work piece material machined surface has the desired hole dimensional diameter.

4. The method of claim 1, further comprising brazing the component after the fluoride ion cleaning.

5. The method of claim 1, the component shape and dimensions formed by orbiting an EDM or laser ablation machining apparatus in a pattern that is smaller than the desired component shape and dimensions, the performed FIC process terminated before removing all of the formed recast layer, so that an exposed surface of the remaining formed recast layer defines the desired component shape and dimensions.

6. A method for machining a hole within a superalloy component, comprising:

establishing desired component shape and dimensions for forming a hole defined by a work piece machined surface to be formed by an electrical discharge machining (EDM) or laser machining ablation method, which creates a recast oxide layer on the machined formed surface;

establishing ablation machining speed and energy application rates for forming the machined surface to the desired component hole shape and dimensions;

determining recast oxide layer thickness that will result from performing the ablation machining speed and energy application rates, prior to said machining;

determining a fluoride ion cleaning (FIC) process that is intended to remove all of the previously determined oxide layer thickness, prior to said cleaning;

ablation machining the work piece with an EDM or laser machining apparatus, at the established machining speed and energy application rates, so that a resultant machined surface of the work piece conforms with the established component hole shape and dimensions, forming a recast oxide layer of the previously determined thickness there upon;

performing the determined FIC process with FIC apparatus;

inspecting the work piece after completion of the FIC process, in order to confirm that the machined surface of the work piece conforms with the established component hole shape and dimensions and that it has a clean surface, which has no recast layer.

7. The method of claim 6, the component comprising a turbine blade or vane.

8. The method of claim 6, the superalloy component hole shape formed by orbiting an ablation machining device in a pattern that is smaller than the desired component shape and dimensions, the performed FIC process terminated before removing all of the formed recast layer, so that the remaining formed recast layer inner diameter surface adjoining the work piece material having the desired component hole shape and dimensions.

9. The method of claim 6, the component comprising a turbine blade or vane and the component hole shape comprising a circular cooling hole or seal slot.

10. The method of claim 9, further comprising brazing the component after the fluoride ion cleaning.

11. The method of claim 9, further comprising welding or brazing the formed work piece surface prior to performing the ablation machining of the surface.

* * * * *